Feb. 28, 1950 D. M. BASSETT ET AL 2,498,636

ELECTRONIC MULTIPLE PULSE GENERATOR

Filed Nov. 8, 1945

INVENTOR
DEWEY M. BASSETT
GEORGE A. LANGSTON
BY William D. Hall.
ATTORNEY

Patented Feb. 28, 1950 2,498,636

UNITED STATES PATENT OFFICE 2,498,636

ELECTRONIC MULTIPLE PULSE GENERATOR

Dewey M. Bassett and George A. Langston, Dayton, Ohio

Application November 8, 1945, Serial No. 627,516

3 Claims. (Cl. 250—27)

Figure 2:
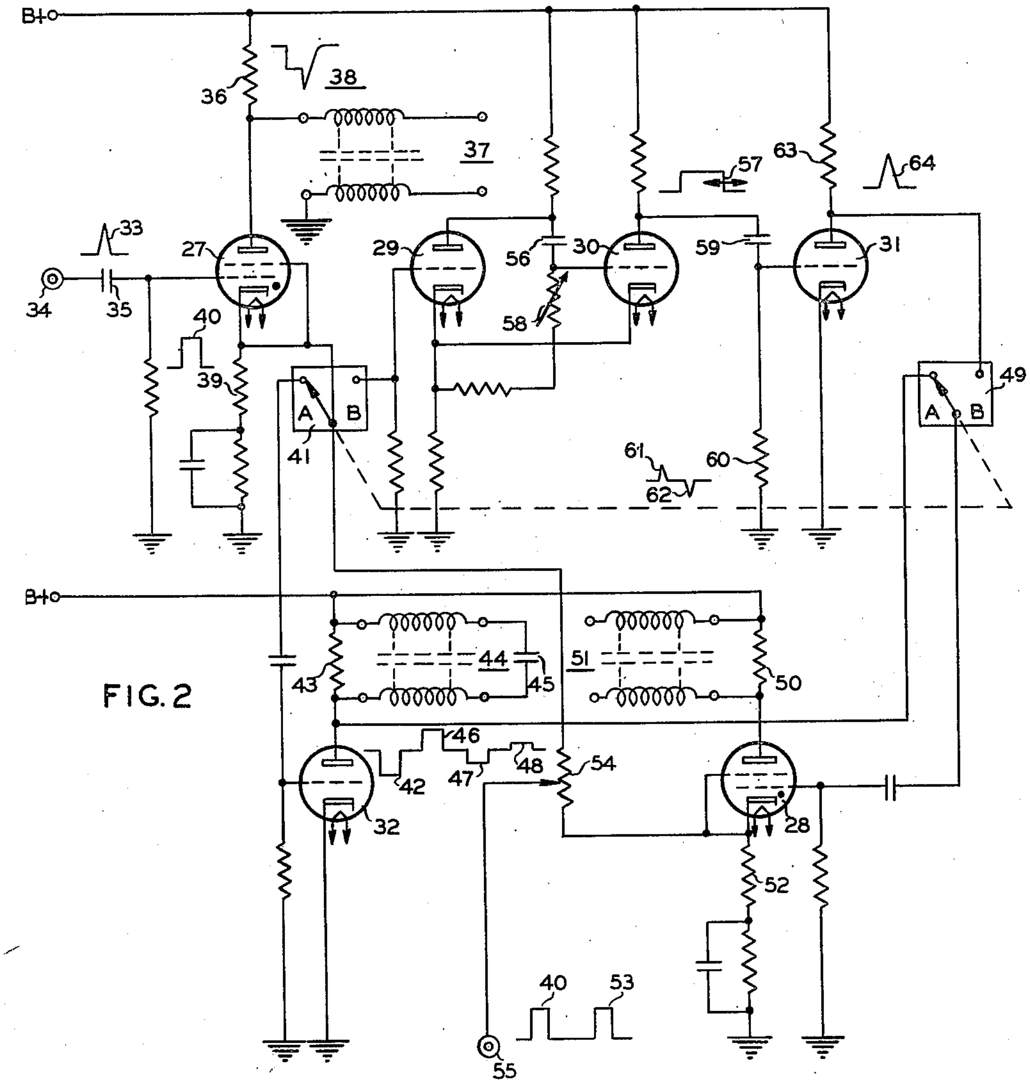

(Granted under the act of March 3, 1883, as amended April 30, 1928; 370 O. G. 757)

The invention described herein may be manufactured and used by or for the Government for governmental purposes, without the payment to us of any royalty thereon.

The present invention relates to electrical circuits for generating pulses in the order of microseconds and more especially to a circuit arrangement for producing in response to a triggering pulse paired pulses of controllable width and spacing.

Numerous applications exist in pulse transmission and reception systems for circuits yielding in response to a triggering pulse paired pulses adjustable both in width and spacing. For example, in one type of aircraft interrogator-transponder system, wherein the transponder unit intercepts a pulse transmitted by the interrogator, the transponder then replies with a paired pulse which serves to actuate an identification coding device operating in conjunction with the interrogator receiver.

Circuits hitherto devised to generate paired pulses have suffered from certain deficiencies largely by reason of their instability of operation and difficulties encountered in adjusting the pulse width and spacing within appreciable limits. To overcome the drawbacks of prior art arrangements, it is the object of this invention: first, to afford a new and improved paired pulse generator of simple design, characterized by a high order of stability; second, to provide a generator of this type enabling a relatively wide range of adjustment both in pulse width and spacing.

For complete understanding of the present invention, as well as other objects and features thereof, reference is made to the following detailed description to be read in connection with the accompanying drawing. The scope of the invention will be pointed out and defined in the annexed claims.

Figure 1:
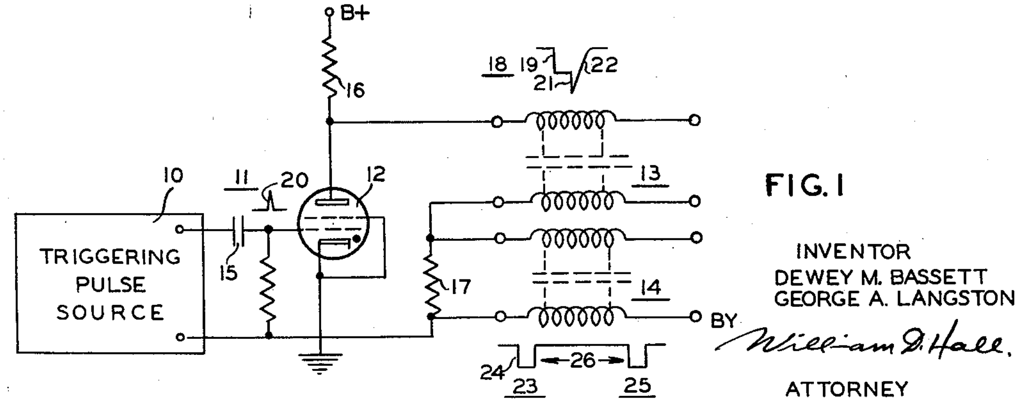

In the drawing:

Fig. 1 is a schematic diagram showing one preferred embodiment of a paired pulse generator in accordance with the invention; and Fig. 2 is a schematic diagram showing another preferred embodiment thereof.

Referring now to Fig. 1 the paired pulse generator is shown to comprise a source 10 of triggering pulses for producing positive-going pulses assuming the form depicted by pulse 11, a grid controlled, gas filled discharge device 12, such as the type commonly known by the trade-mark Thyratron, and two, four terminal, artificial transmission lines 13 and 14.

The output of triggering pulse source 10 is impressed upon the control grid of Thyratron 12 through a coupling capacitor 15. Plate voltage for Thyratron 12 is applied through a plate resistor 16. One pair of terminals of transmission line 13 is serially connected with a load resistor 17 between plate and cathode of Thyratron 12, the other terminal pair being free. Artificial lines 13 and 14 each function as delay networks and preferably comprise two layers of solenoid windings, mutually insulated. The distributed capacity existing between the turns of the respective windings, indicated by dashed lines, serves to complete the delay network. It is to be understood that any other suitable type of artificial line may be employed in this circuit.

The behavior of the circuit will now be considered. Positive pulse 11 is injected on the grid of Thyratron 12, firing the tube and causing plate current to flow therethrough. As is characteristic of gas filled tubes, current in Thyratron 12 continues to flow after the firing potential has been removed from the control grid, hence a voltage negative with respect to plate is developed across plate resistor 16. Whereupon a negative-going pulse is propagated along transmission line 13 which, being open at the free end, acts to reflect said pulse after a time interval determined by the effective length of the line, and returns the reflected pulse to the plate of Thyratron 12.

The returned pulse serves to extinguish Thyratron 12. The voltage wave seen on the plate of Thyratron 12 after it is fired by triggering pulse 11 is plotted in form 18. The leading edge 19 of form 18 coincides in time with the leading edge 20 of pulse 11 and indicates by its length the drop across plate resistor 16. Plate current continues flowing until the reflected pulse from artificial line 13 is applied to the plate, whereupon the resultant negative voltage represented in form 18 by edge 21, contributes to the drop across plate resistor 16 and is of a magnitude which extinguishes Thyratron 12, as indicated by trailing edge 22, thereby restoring the plate voltage to its static level.

The pulse 23 developed across load resistor 17 has a width in time equal to the duration of current flow in Thyratron 12, being equivalent to the spacing between leading edge 19 and edge 21 of voltage wave 18. The width of pulse 23 may be adjusted by varying the delay time introduced by transmission line 13. It is also evident that the leading edge 24 of pulse 23 coincides in time with the leading edge 20 of triggering pulse 11, but that its width is not related thereto.

Pulse 23 is propagated along artificial transmission line 14, and since the free end of the line is open circuited, the pulse is thereby reflected. The impedance of load resistor 17 is preferably matched to the characteristic impedance of line 14. Hence the reflected pulse is fully absorbed by load resistor 17 and a second pulse 25 identical with pulse 23 is developed thereacross.

The time spacing 26 between first pulse 23 and second pulse 25 is determined by the time delay introduced by transmission line 14 and may be adjusted in step-wise fashion within wide limits by adding to or subtracting from the effective length of the line.

It is important to note that load resistor 17 must be exactly matched to the impedance of the transmission line 14, otherwise continued reflections will occur producing a train of pulses of diminishing intensity. The paired pulses are extracted from the circuit across load resistor 17.

Referring now to Fig. 2, there is shown a circuit for producing paired pulses whose width is determined by the time delay introduced by an artificial transmission line and whose spacing is selectively either fixed or variable, variable spacing being accomplished without additions to artificial lines. The circuit includes two Thyratron tubes 27 and 28, and four triode vacuum tubes 29, 30, 31 and 32.

In operation an incoming positive-going trigger pulse 33 is applied at input terminal 34 and injected in Thyratron 27 through coupling capacitor 35, the pulse being of a magnitude sufficient to fire the tube. The resultant voltage drop across plate resistor 36 causes a negative pulse to be propagated along an open ended artificial transmission line 37 connected between the plate of Thyratron 27 and ground. The resultant reflected negative pulse is applied to the plate, thereby extinguishing the tube. The voltage wave 38 on the plate of Thyratron 27 assumes the same shape as that of form 18 in Fig. 1.

Thus there is developed across cathode resistor 39 a square wave pulse 40, of the same polarity as trigger pulses 33, whose leading edge is coincident in time with the leading edge of trigger pulse 33 and whose width is determined by the time delay introduced by artificial transmission line 37. The cathode of Thyratron 27 is tied to the movable arm contact of a single pole, double throw switch 41 which serves to apply pulse 40, at position A, to a circuit arrangement including triode 32 and Thyratron 28, for producing a second pulse of fixed spacing therefrom, and at position B to an arrangement including triodes 29, 30, 31 and Thyratron 28, providing a second pulse of variable spacing therefrom.

Considering now the operation of the circuit with switch 41 in position A, positive pulse 40 is applied to the grid of triode 32, causing a negative square wave pulse 42 to be developed across plate resistor 43. Shunted across plate resistor 43 is one pair of terminals of an artificial transmission line 44, the other terminal pair being connected to a fixed capacitor 45 which effectively shorts the line. Negative pulse 42 is propagated along line 44 and is then reflected in reverse polarity by capacitor 45. Thus a positive pulse 46 is developed across plate resistor 43. In order to have a relatively large voltage drop across resistor 43, its value is large relative to the impedance of artificial line 44. As a result continued pulse reflections of diminishing magnitude and alternating polarity occur as indicated by pulses 47 and 48. The plate output of triode 32 is fed through the A position of a second, single pole, double throw switch 49 to the grid of Thyratron 28.

Switch 49 is mechanically ganged with switch 41 whereby when switch 41 is at position A switch 49 is likewise positioned. The bias on Thyratron 28 is adjusted so that the tube is fired only by the magnitude in the order of the first positive pulse 46 produced by triode 32. When Thyratron 28 is fired, a negative voltage is developed across plate resistor 50. An open-ended artificial transmission line 51 connected across plate resistor 50 results in a reflected negative pulse which extinguishes Thyratron 28 after a time interval determined by the effective length of the line. Thus there is established across cathode resistor 52 a positive going square wave pulse 53 whose width is determined by artificial line 51.

The first positive square wave pulse 40 which is developed across cathode resistor 39 is extracted from the circuit at an output terminal 55 connected to the tap of a potentiometer 54 connected between the cathodes of Thyratron 27 and 28. Also appearing at output terminal 55 is the second positive going square wave pulse 53 developed across cathode resistor 52 which is spaced from pulse 40 at an interval determined by the effective length of artificial line 44.

The circuit behavior will now be considered with switches 41 and 49 set at the B position to obtain paired pulses at terminal 55 of variable spacing. In this instance positive going square wave pulse 40 produced in the output of Thyratron 27 in response to triggering pulse 33 is injected on the grid of triode 29. The grid of triode 30 is coupled to the plate of triode 29 through coupling capacitor 56, these triodes being arranged to function as an unbalanced multivibrator producing a single square wave 57 in response to a triggering pulse. The width of square wave pulse 57 is controlled by variable resistor 58. The plate of triode 30 is connected to the grid of triode 31 through a differentiating network consisting of capacitor 59 and resistor 60. The effect of the differentiating network is to produce a positive pip 61 aligned with the leading edge of square wave 57 and a negative pip 62 aligned with the trailing edge thereof. Therefore it will be seen that time position of the negative pip 62 in effect is controlled by variable resistor 58.

Triode 31 is zero biased to draw current at saturation level, hence the positive pip 61 does not further influence the plate current. Negative pip 62, however, causes a positive pip 64 to be formed across plate resistor 63, which pip is applied to the grid of Thyratron 28 to fire same. Across cathode resistor 52 there is established the second positive square wave pulse 53 whose spacing from the first square wave pulse 40 is, in effect, controlled by variable resistor 58 since its leading edge is coincident with negative pip 62.

It is to be noted that while variable spacing may be obtained in the A positions of switches 41 and 49 by adding or subtracting to the artificial lines involved in the resultant arrangement, it is more desirable in practice to employ the arrangement brought about in the B positions since the spacing between pulses is continuously variable and more easily adjusted.

Thus there has been shown what at present are considered preferred embodiments of the invention. It is evident that many changes and modifications may be made in the circuits without departing from the invention and it is therefore intended in the accompanying claims to cover all such changes and modifications as fall within the true spirit and scope of the invention.

What is claimed is:

1. A circuit for producing in response to a triggering pulse paired pulses adjustable in spacing comprising a first pulse forming arrangement including a grid controlled, gas filled, discharge device, a plate voltage source for said device, a voltage dropping resistor in series with said source and said device, a load impedance for said device, an open reflecting delay line connected to the output of said discharge device, means for applying a triggering pulse to the control grid of said device to fire same whereby a first pulse is established across said impedance, means responsive to said first pulse for producing a square wave adjustable in width, means for differentiating said square wave to obtain therefrom a trailing edge pip, a second pulse forming arrangement identical with said first arrangement and responsive to said trailing edge pip for developing a second pulse whose spacing from said first pulse is substantially determined by the width of said square wave.

2. A circuit for producing in response to a triggering pulse paired pulses adjustable in spacing comprising a first pulse forming arrangement including a grid controlled, gas filled, discharge device, a plate voltage source for said device, a voltage dropping resistor in series with said source and said device, a load impedance for said device, an open reflecting delay line connected to the output of said discharge device, means for applying a triggering pulse to the control grid of said device to fire same whereby a first pulse is established across said impedance, an unbalanced multivibrator circuit responsive to said first pulse for producing a square wave adjustable in width, means for differentiating said square wave to obtain therefrom a trailing edge pip, a second pulse forming arrangement identical with said first arrangement and responsive to said trailing edge pip for developing a second pulse whose spacing from said first pulse is substantially determined by the width of said square wave.

3. A circuit for producing in response to a triggering pulse paired pulses adjustable in spacing comprising a first, pulse forming arrangement including a grid controlled, gas filled, discharge device, a plate voltage source for said device, a voltage dropping resistor in series with said source and said device, a first load impedance for said device, an open reflecting delay line connected to the output of said discharge device, means for applying a triggering pulse to the control grid of said discharge device to fire same whereby a first pulse is established across said first impedance, a grid controlled vacuum tube, a second load impedance in the output circuit of said tube, a capacitor terminated reflecting delay line of an impedance greater than that of the second impedance connected across said second impedance, means for applying said first pulse to the control grid of said tube to produce a damped train of pulses having alternate polarity across said second impedance, a second pulse forming arrangement identical with said first arrangement and responsive to the second pulse in said damped train, and a third load impedance between said first load impedance and said second load impedance to provide a common output for said first and said second pulse.

DEWEY M. BASSETT.
GEORGE A. LANGSTON.

REFERENCES CITED

The following references are of record in the file of this patent:

UNITED STATES PATENTS

| Number | Name | Date |
|---|---|---|
| 2,266,154 | Blumlein | Dec. 16, 1941 |
| 2,394,389 | Lord | Feb. 5, 1946 |
| 2,415,093 | Gerwin | Feb. 4, 1947 |
| 2,432,180 | Tourshou | Dec. 9, 1947 |